Oct. 16, 1923.
L. ROUANET
GAUGE
Filed Feb. 16, 1920
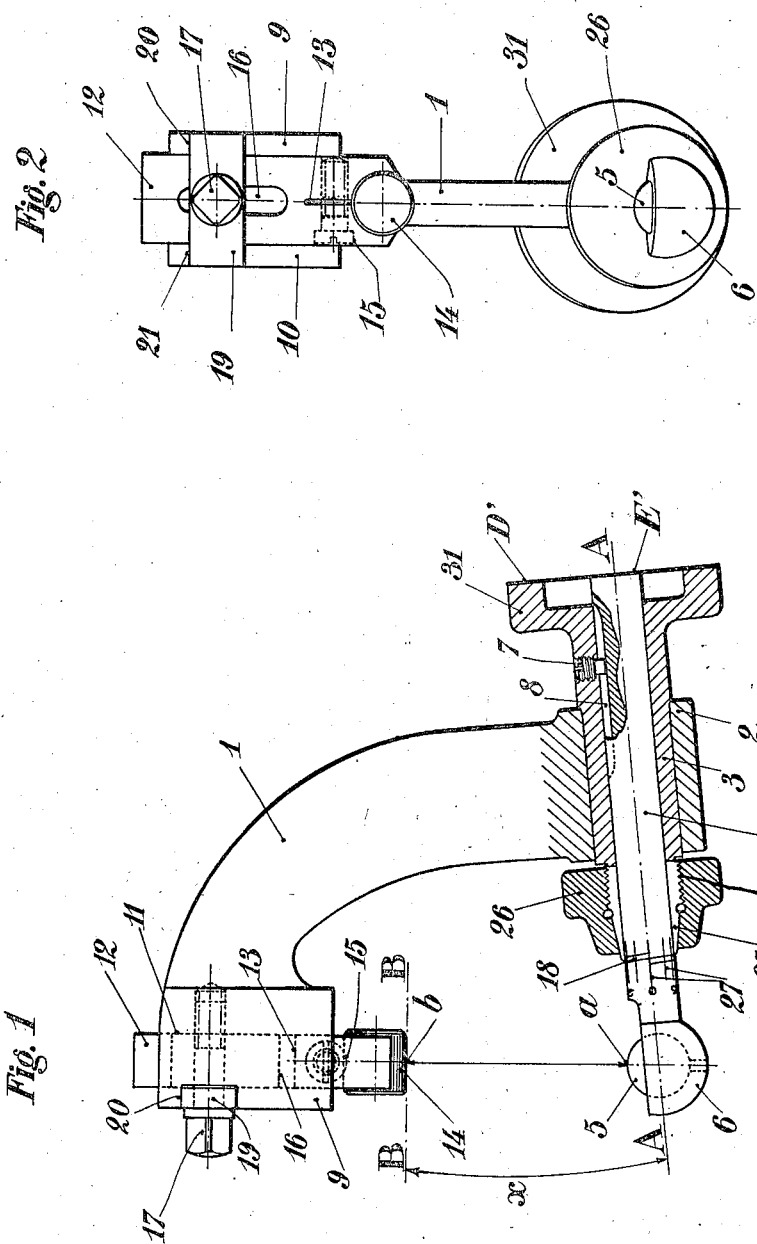
INVENTOR:
Louis Rouanet
By Wm Wallace White
ATTY.

Patented Oct. 16, 1923.

1,471,211

UNITED STATES PATENT OFFICE.

LOUIS ROUANET, OF IVRY-PORT, FRANCE, ASSIGNOR TO COMPAGNE D'APPLICATIONS MECANIQUES, OF PARIS, FRANCE.

GAUGE.

Application filed February 16, 1920. Serial No. 358,876.

*To all whom it may concern:*

Be it known that I, LOUIS ROUANET, citizen of the Republic of France, residing at 42 Rue Franklin, Ivry-Port, Seine, in the Republic of France, have invented new and useful Improvements in Gauges, of which the following is a specification.

This invention relates to a caliper gauge of the C type which, among other uses, may be employed for verifying the diameter of inner rings of ball or roller bearings or like members.

According to one feature of the invention, one of the contacting members of the gauge is formed by a cylindrical body and acts by one of its generatrices whilst the other contact member, which may be spherical or cylindrical, may be shifted in a direction at an angle with the acting generatrix of the first contact member. By means of said arrangement, the opening of the gauge may be varied easily and accurately in order to test members having different diameters.

The first mentioned contacting member is also preferably mounted so that it may be shifted in a direction at right angles to its own axis for the purpose of varying also the dimensions of the gauge.

Other characteristic features will appear from the following description.

In the annexed drawings, given by way of example:

Fig. 1 is a side elevation view, partly in section, of a snap gauge constructed in accordance with the invention.

Fig. 2 is an end view of the same.

The gauge body 1 is provided at one end with a cylindrical head 2 in which is secured a sleeve 3. A cylindrical rod 4 slides within said sleeve and carries at one end a spherical contact member 5 which is conveniently embedded or spun in a cup shaped projection 6 on the rod 4. The rod 4 is prevented from rotating in the sleeve 3 by a screw 7 inserted through the latter and engaging at its end in a slot 8 in the rod 4. For the purpose of obtaining an accurate adjustment of the contact point $a$ of the spherical contact member 5, the centre of the latter is located on the axial line A—A of the rod 4.

The body 1 of the gauge is provided at its opposite end with guide walls 9, 10 between which a sliding block 12 may be shifted, said sliding block being in contact with a suitably planed surface 11 on the gauge body. The slide 12 is slotted longitudinally at 13 and carries a cylindrical contact member 14 which is clamped in position by means of a screw 15.

The slide 12 may be shifted at right angles to the axis of the cylindrical contact member 14. It is provided for that purpose with an elongated slot 16 through which extends a screw 17 which may be tightly screwed into the gauge body for securing the slide 12 in position. In order to prevent any accidental displacement of the latter when the screw 17 is tightened up, a small plate 19 engaging into recesses 20 and 21 in the said walls 9 and 10 is inserted between the head of the screw 17 and the slide.

The centre of the spherical contact member 5 may be shifted along the axis A—A which is at an angle with respect to the acting generatrix B—B of the cylindrical contact member 14 and located in a plane passing through the axis of the latter. By this means, if the contact member 5 is shifted to the left (Fig. 1) a member having a diameter greater than $a$—$b$ may be inspected whilst if the said contact member 5 is shifted to the right, the gauge may be used for inspecting pieces having a smaller diameter.

The sleeve 3 is provided with a screw-threaded part 24 and a conical end 25. Said parts 24, 25 are slotted longitudinally whereby the rod 4 may be clamped within the stationary sleeve 3 by means of a nut 26 having a conical bore corresponding to the conical part 25.

The rod 4 is provided with a helical line 18 and equidistant longitudinal divisions 27 by means of which the distance, such as $a$—$b$, between the two contact members of the gauge may be accurately ascertained. If, for instance, the angle $x$ between A—A and B—B is such that $\sin x = \frac{1}{10}$, a displacement of 1 millimeter of the contact member 5 along A—A will correspond to a variation of $\frac{1}{10}$ millimeter of $a$—$b$ and if the helical line 18 has a pitch of one millimeter and if ten equidistant divisions 27 are provided, it will be possible to measure the distance $a$—$b$ in 1/100 of a millimeter by ascertaining which point of intersection of the helix 18 and the division lines 27 coincide with the end of the stationary conical part 25. It will thus be possible, by shifting the rod 4 axially within the sleeve 3, to obtain a gauge having exactly the dimension desired.

Having now described my invention, what I claim as new and desire to secure by Letters Patent is:

1. A gauge comprising in combination a body, a block slidable on said body, means for clamping said block on the body, a cylindrical contact member carried by said block and adapted to engage the work by one of its generatrix lines and a complementary contact member mounted on said body and adapted to be shifted in a direction at an angle with said generatrix.

2. A gauge comprising in combination a body, a block slidable on said body, means for clamping said block on the body, a cylindrical contact member carried by said block and adapted to engage the work by one of its generatrix lines, an axially movable rod mounted in the body and having its axis in a direction at an angle with the said generatrix and a complementary contact member on said rod.

3. A gauge comprising a body, a block slidable on said body, means for clamping said block on the body, a cylindrical contact member carried by said block and adapted to engage the work by one of its generatrix lines, an axially movable rod mounted in the gauge body and having its axis in a direction at an angle with the said generatrix, a complementary contact member on said rod, said rod carrying a helical line and equidistant longitudinal divisions intersecting with the helical line and adapted to indicate the distance between the contact members of the gauge.

In testimony whereof I have signed my name to this specification.

LOUIS ROUANET.